March 17, 1936.  L. M. DIETERICH ET AL  2,034,230
COLOR PHOTOGRAPHY
Filed Feb. 17, 1933
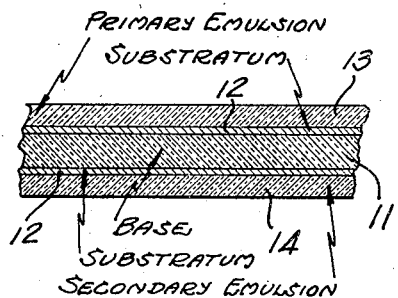
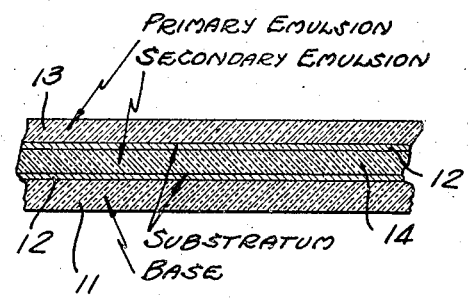
Fig. 1.  Fig. 2.
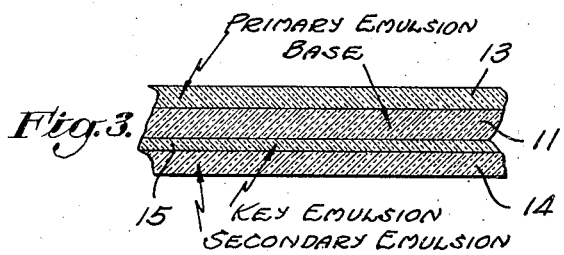
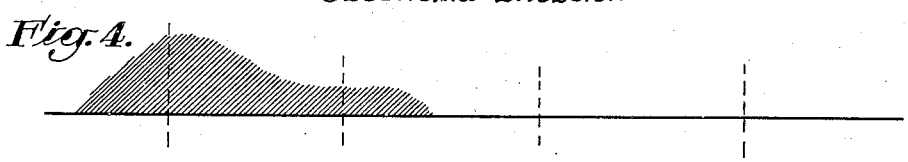
Fig. 4.
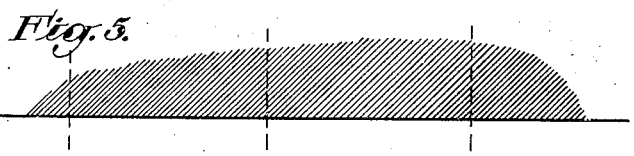
Fig. 5.
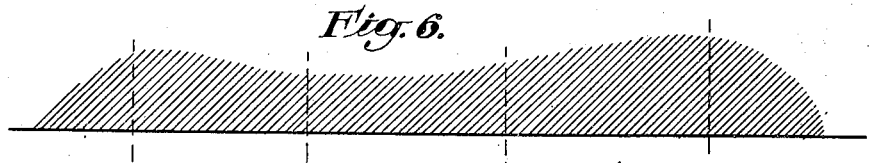
Fig. 6.
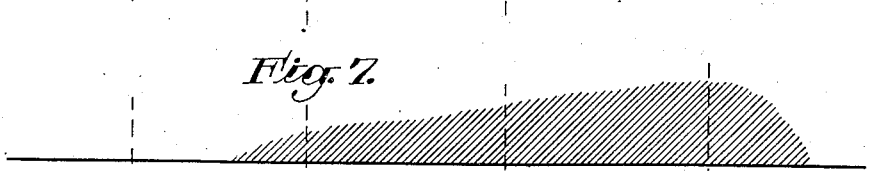
Fig. 7.
BLUE  GREEN  YELLOW  RED
INVENTORS:
LUDWIG M. DIETERICH,
DONALD K. ALLISON,
By Robert W. Fulwider
ATTORNEY Patented Mar. 17, 1936

2,034,230

UNITED STATES PATENT OFFICE 2,034,230

COLOR PHOTOGRAPHY

Ludwig M. Dieterich and Donald K. Allison, Los Angeles, Calif., assignors to Detracolor Ltd., Los Angeles, Calif., a corporation of Nevada Application February 17, 1933, Serial No. 657,208

21 Claims. (Cl. 95—2)

Our invention relates in general to the art of color photography and more particularly to sensitized films adapted for use in that art and to a method and means for utilizing such films in the accomplishment of substantially true color rendition. While our invention can be utilized in both still and motion picture photography, it finds its chief application in the production of motion pictures, for while many types of film and processes have been devised for the coloring of still pictures, the inherent difficulties encountered in applying these various methods to the highly specialized industry of motion picture production with its enormous quantities of film to be handled have, so far as we are aware, not heretofore been successfully overcome. Because our system of color photography is, as we mentioned, particularly applicable to the production of motion pictures, we will confine our description herein to that application of our invention, although it is to be understood that we do not intend to thereby restrict the scope of our invention and whenever we use the term "film", it is to be taken as including plates and all other types of photographic media.

It is an object of our invention to provide a photographic film with latent coloring media therein of such a nature that substantially true color images may be obtained in latent values by exposing the film in the manner now customarily employed in the production of black and white pictures.

It is also an object of this invention to provide a photographic film which after exposure may be treated in a manner as simple as that used for the treatment of black and white film now on the market, and which after such treatment will correctly reproduce the colors of the object photographed.

It is a further object of our invention to provide a photographic film adapted for natural color rendition which will compare favorably in cost of manufacture with the commercial films now on the market for black and white work and to provide a method of processing such film which, because of its simplicity, will be much more economical than any process heretofore advanced for the production of colored pictures.

A disadvantage common to practically all of the systems heretofore advanced for producing photographs in color has been the need of having a very different type of film for the photographic negative and for positive prints made therefrom. It will be evident from the following description of our invention that we have overcome this difficulty and are able to use the same type of film and method of treating it for obtaining the negative and the positive prints. However, it is possible to use a somewhat slower emulsion for the positive if desired and preferably one with a finer grain than the usual emulsion for negative work, as for instance a silver chloride emulsion for the positive and a silver bromide emulsion for the negative.

Another object of our invention is to eliminate the necessity of using special cameras, magazines, filters, printers and other specialized equipment heretofore required for the production of motion pictures in color and to thereby materially reduce the cost, uncertainty and time required in obtaining photographic reproductions in natural colors.

It has been well known in the art that by properly combining two or more so-called primary colors various intermediate colors and shades can be obtained and it is recognized that at least three primary colors are necessary to reproduce all the colors of the spectrum. However, to secure this reproduction the three colors used must be true spectral colors which is not possible to obtain with known dyes and we have found that true color reproduction can best be obtained by the use of four primary or basic colors.

When it is necessary to use a separate coloring medium for each of the primary colors obtained in such a multi-color system (four colors for example), it is at once evident that the process must be both complicated and cumbersome. It is, therefore, an object of this invention to secure a rigorous four-color separation and reproduction while only using two photographic emulsions and two coloring media.

It is a still further object of our invention to provide a method of securing photographic reproductions in color which is entirely free from definition and exposure troubles in exposing the negative or negatives and from registration troubles in printing the positives and which, therefore, insures a photograph in correctly balanced colors without fringe and which is clear and distinct in every detail. Furthermore, by superpositioning a plurality of emulsion layers of different spectrum characteristics halation is greatly reduced.

These and other objects and advantages not specifically enumerated herein are attained by the types of film and means of film treatment illustrated in the accompanying drawing and hereinafter more fully described.

In the drawing

Fig. 1 represents an enlarged cross section of a preferred type of film having an emulsion on each side of the base.

Fig. 2 shows an alternative type of film adapted for use in our invention having two emulsions on one side of the base.

Fig. 3 shows another alternative form of film having two emulsions on one side of the base and one emulsion on the reverse side thereof.

Fig. 4 is a spectrogram of the orthochromatic emulsion type.

Fig. 5 is a spectrogram of the red filter dye.

Fig. 6 is a spectrogram of the panchromatic emulsion type.

Fig. 7 is a spectrogram of the combined filter dye and panchromatic emulsion.

Referring to Fig. 1 which depicts a preferred type of film construction for the practice of our invention, the numeral 11 represents a base of celluloid, glass or other suitable, substantially transparent substance.

The base 11 may be coated on each side with a very thin substratum 12 of gelatin or some other suitable substance of which there are numerous now used in making the various types of photographic films available commercially. While we have shown a substratum on each side of the base, the film can also be made with only one substratum if desired, or without a substratum. On one side of the base 11 (the upper side in Fig. 1) and over the substratum 12 a photographic emulsion 13 is coated which may be of the usual thickness of approximately .05".

The opposite side of base 11 is coated with another photographic emulsion 14 preferably of similar thickness but of different characteristics from the emulsion 13 as will hereinafter be fully explained.

The emulsion 13 which we will term orthochromatic, although it has a slightly different sensitivity range from the commercially known orthochromatic film, is sensitized only for the blue-to-green end of the spectrum extending slightly into the green range thereof as shown by Fig. 4. The emulsion 14 may be similar to the usual type of panchromatic emulsion now on the market and is light sensitive to substantially all colors as shown in Fig. 6, but predominantly to the red end of the spectrum and preferably should cut off sharply at a wave length of about 710 millimicrons. As previously mentioned, our invention comprehends the use of substantially the same type of film for both negative and positive; and consequently we will only describe the film and treatment thereof in detail as to the negative. In exposing the negative, the film is placed in the camera with the orthochromatic emulsion 13 outermost facing the object to be photographed, and the exposure made in the usual manner. Upon exposure the rays of light will fall first on the orthochromatic emulsion 13, which, being sensitive only to the blue-to-green end of the spectrum will record only those objects from which light containing blue-to-green rays is reflected or transmitted and will not record those objects from which light containing the other colors of the spectrum is reflected. Due to the translucency of the orthochromatic emulsion 13, which we will refer to as the primary emulsion, most of the light passes through it to the panchromatic emulsion which we will refer to hereafter as the secondary emulsion.

While the intensity of the blue rays reaching the secondary emulsion 14 is considerably diminished by reason of their absorption by the primary emulsion 13, still sufficient blue-to-green rays reach the secondary emulsion 14 to cause it to also record some blue-to-green values. To obviate this situation a removable red dye with a transmission characteristic substantially as shown by Fig. 5 or similar as an example to that of a Wratten filter #15 may be provided in one or both of the substrata 12; one of the many dyes suitable for this purpose being phenol-phthalein. This removable red dye has a color characteristic such that it passes a slight amount of the green rays, and increasing amounts of the rays of colors further toward and including the red end of the spectrum. It is desirable that this dye be soluble to facilitate removal. The secondary emulsion 14 being light sensitive to all colors will, of course, be affected by all of the light rays passed by the removable filter dye.

We have described the above combination of semi-standard panchromatic emulsion and red filter dye as the preferred form of our invention because of the relatively low cost of securing this type of emulsion commercially. It will be understood, however, that it is possible and entirely feasible by means now well known in the art to produce an emulsion by the proper use of chromatizing dyes, which will be light sensitive only to the green-to-red portion of the spectrum. Such an emulsion used in our invention as the secondary emulsion will, of course, obviate the necessity of a filter dye between the primary and secondary emulsions. The choice between these two methods of controlling the light-sensitive range of the secondary emulsion depends entirely on the relative costs of production, each having equal merit as to the quality of color separation and rendition.

The primary emulsion 13 has mixed in it or is impregnated either before or after coating with a latent blue dye known to the art as the blue leuco base or the leuco base of a blue dye. The leuco base of a dye can be defined as being a substance which in its normal state is colorless and which upon suitable treatment takes on a predetermined color. We have found that the leuco base of methylene blue (tetramethyldiaminothiazonium chloride) of the triazine series of aniline dyes is suitable for use in emulsion 13 giving a blue of the desired characteristics, there being, however, numerous leuco bases of this group as well as bases of dyes in the diphenylmethane, triphenylmethane, azine and acridine series, which may be used.

The secondary emulsion 14 is likewise impregnated either before or after coating with a leuco base which will upon subsequent treatment give a yellow color in its light densities and a red color in its heavy densities. A leuco base having these characteristics is the leuco base of auromine (imino tetramethyldiparamino diphenylmethane hydrochloride) of the diphenylmethane series of aniline dyes, although all of the before mentioned series of aniline dyes have leuco bases that may be used. As will become apparent from the following description of our method of treating said film, it is essential that the latent dyes or leuco bases used have the characteristic of not diminishing to an appreciable extent the sensitivity of the photographic emulsion or of affecting the latent silver image produced when the film is exposed to light.

Having now described the construction of the film used in our system of obtaining photographic images in natural colors, we will proceed to describe the method of utilizing that film and of treating it to bring out the final colored positive picture.

A film constructed in accordance with our invention which we will for descriptive purposes denominate the negative raw stock is exposed in any standard type of camera in the same manner as ordinary negative stock is now exposed to secure black and white pictures, it being understood, of course, that our film and process are equally applicable to both still and motion picture photography. When the film is exposed, two images are normally secured, one in each emulsion, unless, of course, the subject photographed is all one color and no other rays of light fall on the film. As previously mentioned, the primary image will record the blue color values and the green color values in lesser intensity. The secondary image will record all of the color values in the object photographed except the blue but in varying densities, the greens and yellows in relatively low densities and the reds in relatively high densities.

The exposed film is then developed in any of the well known developing solutions and washed. During this developing and washing step the removable soluble dye (if used) in the substratum or in the emulsion is being washed out. After development, the images are composed of free metallic silver and shade from light greys to black depending upon the intensity of the light which impinged on the respective emulsions, the respective leuco bases being unaffected by this step and likewise not affecting the development. The developed film is then immersed for several minutes in a solution such as bromine water, chlorine water, potassium ferricyanide, or other solution which will oxidize the free silver to a silver salt. As this oxidation proceeds, the color is brought out in the respective leuco bases which are selectively mordanted in situ by the silver salt as formed.

The film is then subjected to a thorough water wash to remove the unmordanted dye from the unexposed portions of the emulsions and is immersed in a fixing solution such as sodium thiosulphate containing a small amount of tannic acid.

The action of the fixing solution is to remove the translucent silver salt and re-mordant the dye in situ to give a transparent image having the desired colors. When the film becomes sufficiently transparent it is given another water wash and dried, the finished product being a negative portraying each object photographed in its proper color but having the densities reversed; that is to say, dark colored objects are shown as light colored in the negative and the light colored objects are shown as dark colored, which condition follows naturally from the fact that the density of the negative images is directly proportional to the amount of light falling on the film which in turn is inversely proportional to the shade of the object photographed.

To obtain a positive print of the original object photographed the finished color-negative is printed, preferably by contact printing to the orthochromatic side of a sensitized film which may be similar but need not be identical in all respects to the negative raw stock and which we will, for descriptive purposes, designate as the positive raw stock. It will be evident that the positive raw stock is then exposed to the same colors and receives light rays from the same parts of the spectrum as the negative received on being exposed to the light reflected from the original object photographed, except that where the negative received white light, the positive will receive no light, and where the negative received no light the positive will be exposed to white light. The shades of the various colors will also be reversed, the light blue, for instance, on the negative will pass a relatively large amount of light causing a heavy exposure on the positive and the dark blue on the negative will pass a relatively small amount of light with a consequent slight exposure of the positive, giving on final treatment as an example a light blue which corresponds with the light blue of the object photographed.

After the positive stock is exposed in printing, it is developed and treated as was the exposed negative giving a resultant photograph in substantially natural colors. The blues are given by the blue dyed image in the primary emulsion. The greens are formed by a combination of blue and yellow, for they have been recorded in each emulsion and when the primary image is dyed blue and the secondary image dyed yellow, the resultant color of light projected through this portion of the film will be green, its shade and intensity correctly duplicating the shades of the original object. The yellows have been recorded only on the secondary emulsion and in the final photograph are correctly portrayed due to the characteristic of the leuco base used, which on treatment appears yellow in its lower densities. The oranges and reds are obtained by reason of the red dyed image in the secondary emulsion, there being no superposed image of these colors in the primary emulsion. With these elemental colors correctly recorded it will be evident that various intermediate combinations and shadings will also be obtained so that the final positive picture will correctly portray substantially all of the colors photographed.

Referring now to Fig. 2, we have shown an alternative type of film differing only from our preferred type as illustrated in Fig. 1 in that both emulsions are on the same side of the base. As will be noted from an inspection of the drawing, there is a base 11, a substratum 12, primary orthochromatic emulsion 13 and secondary panchromatic emulsion 14.

In this case where both of the emulsions are on the same side of the base 11, it is necessary to have the red filter dye if the same is used, placed either between the two emulsions or impregnated throughout the secondary emulsion so that the blue light rays will be prevented from affecting the secondary emulsion and exposing it as previously explained in regard to our preferred type of film. The treatment after exposure is substantially the same as the treatment hereinbefore set out at length for the type of film illustrated in Fig. 1, it being understood of course that by properly sensitizing the secondary emulsion the filter dye can be dispensed with.

In Fig. 3 we have shown a modified form of film for use in our invention which partakes of the characteristics of each of the previously mentioned types of film. A base 11 is provided as before with an orthochromatic or primary emulsion 13 on one side thereof. The other side of the base 11 is coated with a very thin panchromatic emulsion 15 which we shall call a key emulsion. This key emulsion carries the removable filter dye previously described (if used) and which, in the type of film illustrated in Fig. 1 is carried by the substratum 12. Superposed on the key emulsion is another panchromatic emulsion 14 similar to the panchromatic or secondary emulsion described in regard to Fig. 1.

The exposure and treatment of this type of film is similar to that already described in detail, but the resulting photograph both negative and positive has three images therein, namely, a primary colored image and a secondary colored image as obtained in the other types of film and a black and white key image which has recorded all colors and which not only gives increased definition to the resulting photograph but causes also increased visual color contrasts.

If it is desired to produce a sound motion picture by the sound on film method, our film is made with the customary sound track along one side thereof. If it is desired to record the sound on the picture negative as is often the case in news-reel work this can be accomplished in like manner as it is now accomplished for black and white photography. However, the sound is usually recorded on a separate negative and developed separately. In either case the negative sound track is printed to the positive picture film and in our invention may be either black and white or colored and white. If a black and white sound track is desired the negative track is printed to the positive and is recorded in both the primary and secondary emulsions, and also in the key emulsion if the type of film illustrated in Figure 3 is used. When the colors are brought out in the finished positive there will be a blue sound track on the primary side of the base and a red superposed sound track on the secondary side, the combination of the two giving a black and white finished sound track.

If for any reason a colored finished sound track is desired this can be accomplished by modifying the film or the printing thereof, as by inserting a blue filter in the sound track printer apperture so that the sound track is printed on only one emulsion, preferably the primary. When the final coloring is obtained the sound track being on one side only, will, of course, bear only one color.

While we have described a preferred form of our invention as applied to motion picture films, it is to be understood that it is equally applicable to still photography also. In this case a film as shown in Fig. 2 is used for the positive, the base being of paper or other suitable material which will produce an opaque light reflection base instead of the cellulose composition used for motion picture film. It will be found that a film of this nature develops as readily as the form shown in Fig. 1, for the reason that the developing solution penetrates through the paper base to act on the inner emulsion from the rear while also going into the outer emulsion from the face of the film.

It will now be seen that we have provided a system of color photography which not only gives a reproduction of all colors photographed, but also one that faithfully reproduces the gradations and shades of each individual color, by reason of the fact that we color the negative and positive image in each instance with the same color as that to which it is sensitive, as contradistinguished from the formerly known processes of coloring the positive images respectively with colors complementary to those to which their respective negatives were sensitive.

While that form of application of our invention hereinbefore illustrated and described is fully capable of performing the objects and providing the advantages primarily stated, there are various other embodiments and modifications of our invention which are likewise capable of performing these objects and providing these advantages and we therefore wish our invention to be understood as not being restricted to the embodiment hereinbefore described but rather to be determined by the scope of the appended claims.

We claim as our invention:

1. In a photographic film the combination of: a base, a light sensitive emulsion layer on said base which is light sensitive to one end of the spectrum only and which carries the leuco base of a basic dye therein; a second light sensitive emulsion layer on said base which is predominantly light sensitive to the other end of the spectrum and which carries the leuco base of a basic dye therein of a potential color substantially complementary to the potential color of the leuco base in said first emulsion; and a soluble dye of a color and so disposed in said film as to filter out substantially all of that color of light passing through the first emulsion to which the first emulsion is sensitive.

2. In a photographic film the combination of: a base, a light sensitive emulsion layer on said base which is light sensitive to the blue-to-green end of the spectrum only and which carries the leuco base of a basic blue dye therein; a second light sensitive emulsion layer on said base which is light-sensitive to a different but overlapping portion of the spectrum and which carries the leuco base of a basic red dye therein.

3. In a photographic film the combination of: a base, a light sensitive emulsion layer on said base which is light sensitive to the blue-to-green end of the spectrum only and which carries the leuco base of a basic blue dye therein; and a second light sensitive emulsion layer on said base which is predominantly light sensitive to the red end of the spectrum and which carries the leuco base of a basic yellow to red dye therein.

4. In a photographic film the combination of: a base, a light sensitive emulsion layer on said base which is light sensitive to the blue-to-green end of the spectrum only and which carries a leuco base of a basic dye therein; and a second light sensitive emulsion layer on said base which is light sensitive to a different portion of the spectrum and which carries a leuco base of a basic dye therein of a potential color different from the potential color of the leuco base in the first emulsion.

5. In a photographic film the combination of: a base, and a plurality of emulsion layers on said base which are light sensitive to different portions of the spectrum; each of said emulsions being impregnated with an unesterified unetherified leuco base of a different basic dye.

6. In a photographic film the combination of: a base, and a plurality of strata of light sensitive emulsions on said base, said emulsions being light sensitive to different portions of the spectrum and each of said emulsions being impregnated with the leuco base of a basic aniline dye.

7. In a photographic film the combination of: a base, a light sensitive emulsion layer thereon containing the leuco base of a basic dye of the thiazine series; and a second light sensitive emulsion layer on said base containing the leuco base of a basic dye of the diphenylmethane series.

8. The method of producing a photograph in color on a film having a plurality of light sensitive emulsion layers thereon each carrying the leuco base of a dye corresponding in color to its predominant sensitivity range, said film also containing a soluble filter dye therein which includes: exposing said film; developing the latent images obtained thereby; washing out said filter dye; oxidizing said leuco bases to their respective dyes while mordanting them in said images; and removing the dye from the unexposed portion of said film.

9. In a photographic film the combination of: a primary emulsion layer light sensitive to one portion of the spectrum which carries the leuco base of a basic dye; and a secondary emulsion layer which is predominantly light sensitive to a different portion of the spectrum and which carries the leuco base of a basic dye of a color substantially complementary to said first dye.

10. In a photographic film the combination of: a primary emulsion layer light sensitive to one end of the spectrum which carries the leuco base of a basic dye of a color similar to the sensitivity range of said emulsion; and a secondary emulsion layer predominantly light sensitive to the other end of the spectrum and carrying the leuco base of a basic dye of a color substantially complementary to the color of said first mentioned dye.

11. In a photographic film the combination of: a primary emulsion layer which is light sensitive to one portion of the visible spectrum which carries therein the leuco base of a dye of a color similar to the sensitivity range of said emulsion; and a secondary emulsion layer light sensitive to a different but overlapping portion of the visible spectrum which carries the leuco base of a dye having a color substantially complementary to that of said first mentioned dye.

12. In a photographic film the combination of: a plurality of strata of light sensitive emulsion, said strata being light sensitive to overlapping portions of the spectrum and each being impregnated with the leuco base of a basic dye.

13. In a photographic film the combination of two light sensitive emulsion layers, one layer containing the leuco base of a basic dye of the diphenylmethane series, the other layer containing the leuco base of a basic dye of a different color.

14. In a photographic film the combination of two light sensitive emulsion layers, one layer containing the leuco base of a basic dye of the triphenylmethane series, the other layer containing the leuco base of a basic dye of a different color.

15. In a photographic film the combination of two light sensitive emulsion layers, one layer containing the leuco base of a basic dye of the acridine series, the other layer containing the leuco base of a basic dye of a different color.

16. In a photographic film the combination of two light sensitive emulsion layers, one layer containing the leuco base of a basic dye of the azine series, the other layer containing the leuco base of a basic dye of a different color.

17. In a photographic film the combination of two light sensitive emulsion layers, one layer containing the leuco base of a basic dye of the thiazine series, the other layer containing the leuco base of a basic dye of a different color.

18. The method of producing a photograph in color on a film having a plurality of light sensitive emulsion layers thereon each carrying the leuco base of a basic dye corresponding in color to its predominant sensitivity range which includes: exposing said film; developing the latent images obtained thereby; oxidizing said leuco bases to their respective basic dyes while mordanting them in said images; and removing the dye from the unexposed portion of said film.

19. The method of producing a multicolored photograph on a film having a plurality of differently light sensitized emulsion layers each carrying the leuco base of a basic dye of a different potential color which includes: exposing said film; developing the latent images thereby obtained; oxidizing said leuco bases to their respective dye forms; mordanting said dyes in said images; and removing the dye from the unexposed portions of said firm.

20. The method of producing a multicolored photograph on a film having a plurality of differently light sensitized emulsion layers each carrying the leuco base of a basic dye of a different potential color which includes: exposing said film; developing the latent images thereby obtained; treating said leuco bases to cause them to assume their respective colored forms; mordanting said dyes in said images; and removing the dye from the unexposed portions of said film.

21. The method of producing a multicolored photograph on a film having a plurality of superposed sensitized emulsion layers each carrying a leuco base, which includes: exposing said film; developing the latent images thereby obtained; bringing out the color of said leuco bases; and removing the dye from the unexposed portions of said film.

LUDWIG M. DIETERICH.
DONALD K. ALLISON.